United States Patent [19]

Shirakawa

[11] Patent Number: 5,606,629
[45] Date of Patent: Feb. 25, 1997

[54] FIGURE RECOGNITION APPARATUS

[75] Inventor: Takahisa Shirakawa, Tokyo, Japan

[73] Assignee: NEC Corporation, Tokyo, Japan

[21] Appl. No.: 340,384

[22] Filed: Nov. 15, 1994

[30] Foreign Application Priority Data

Nov. 22, 1993 [JP] Japan .................................. 5-313965

[51] Int. Cl.$^6$ ...................................................... G06K 9/48
[52] U.S. Cl. ............................ 382/203; 382/187; 382/272
[58] Field of Search .................... 382/186–189, 382/203, 264, 269, 272

[56] References Cited

U.S. PATENT DOCUMENTS 4,375,081  2/1983  Blesser ................................. 382/186
4,653,107  3/1987  Shojima et al. ...................... 382/189
4,718,103  1/1988  Shojima et al. ...................... 382/189
4,878,249  10/1989  Mifune et al. ........................ 382/187
5,023,918  6/1991  Lipscomb ............................. 382/187

FOREIGN PATENT DOCUMENTS

4-62107  10/1992  Japan .

Primary Examiner—Leo Boudreau
Assistant Examiner—Christopher S. Kelley
Attorney, Agent, or Firm—Foley & Lardner

[57] ABSTRACT

In a figure recognition apparatus, a direction of a vector starting from a sample point most recently stored in a position data memory and terminating at an attention point is compared to an average value of directions of sample point vectors stored in the position data memory. The result of the comparison is used for deciding whether to discard the attention point.

10 Claims, 9 Drawing Sheets

FIGURE RECOGNITION APPARATUS

BACKGROUND OF THE INVENTION

This invention relates to a figure recognition apparatus, and more particularly to an apparatus for recognizing a handwritten figure produced by such a position determination equipment as a digitizer or a tablet.

A figure which is an object of recognition is approximated by a connection of elementary line segments. Usually, two kinds of elementary line segments are used, the one being a straight line segment and the other being a circular arc segment. A point connecting two line segments is called a feature point of the figure. Generally, a figure recognition apparatus detects feature points in a figure and defines the figure by position coordinates of the detected feature points and by kinds of line segments between adjacent feature points. A figure drawn on a sheet is read by a picture input unit such as a TV camera, and is temporally stored in an image memory. Or an image of a figure is generated by an interactive input such unit as a digitizer or a tablet, and position coordinate data for points in the figure are determined by the interactive unit. Thus, it will be said that coordinate positions of all the pixels in the figure are determined by the picture input unit. Therefore, the first step of figure recognition is to detect feature points in the figure.

As a prior art of this invention, there is a Japanese patent application entitled "A system for figure recognition" and laid open as a Provisional Publication No. 62107/'92. This prior art is described in connection with FIG. 8, wherein a block diagram of the prior art is illustrated.

Figure 8:
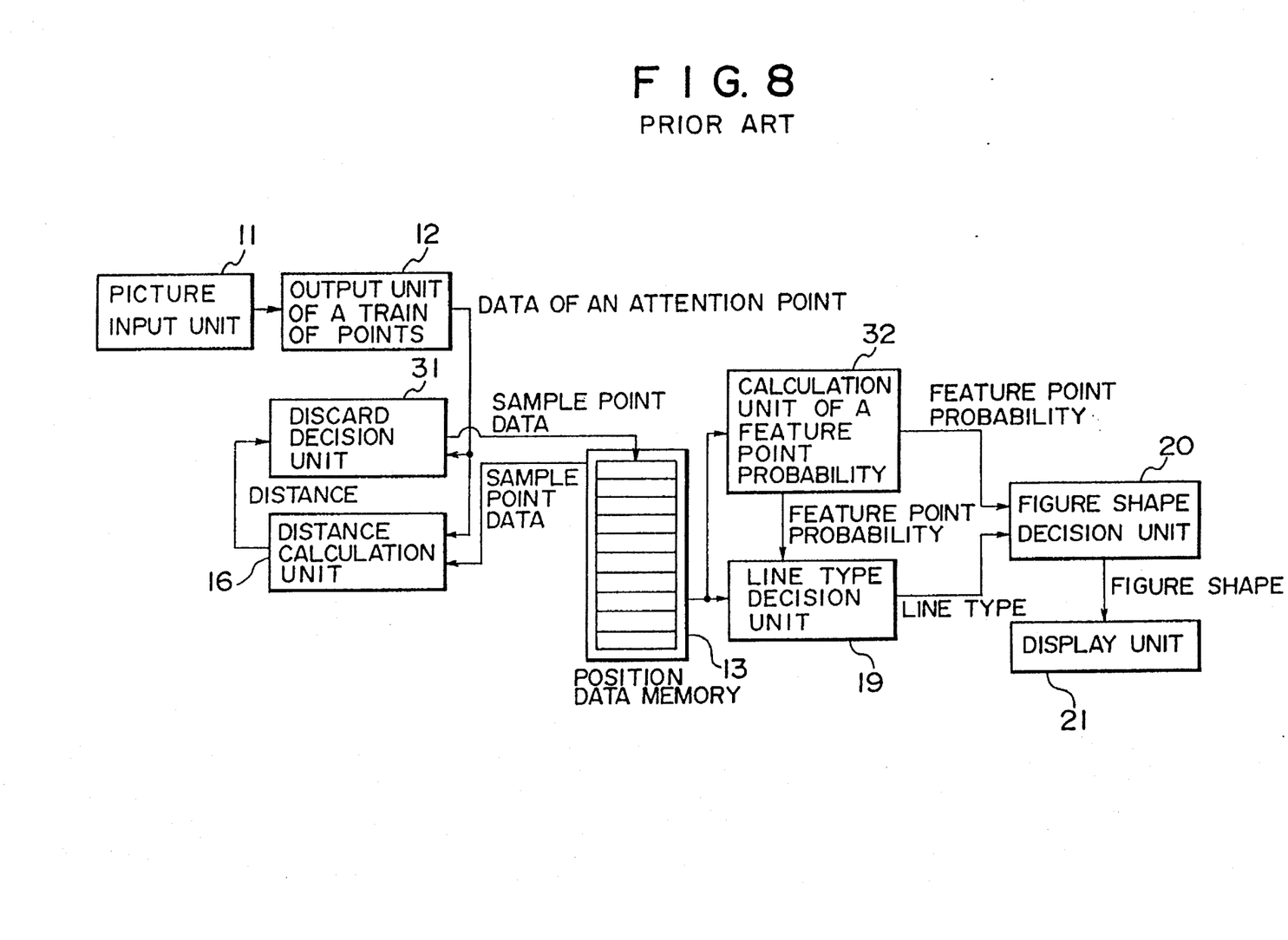
FIG. 8 shows a block diagram of a prior art.

Position coordinate data for points in a figure are determined by a picture input unit 11 and are read out by an output unit of a train of points 12. The train of points read out from the output unit 12 is delivered to a discard decision unit 31, wherein many points are discarded leaving only sample points. Data for the sample points are stored in a position data memory 13. In this specification, data for a point currently read out from the output unit 12 will be called data for an attention point.

The distance between the attention point and the sample point which is lastly written in the position data memory 13 is calculated in a distance calculation unit 16. This calculated distance is referred in the discard decision unit 31 for deciding whether to discard the attention point. A calculation unit for a feature point probability 32, calculates, for each sample point, a probability in which the sample point is a feature point. Line type decision unit 19 decides a line type between adjacent feature points. Figure shape decision unit 20 decides a figure shape from the output of the calculation unit of a feature point probability 32 and the output of the line type decision unit 19. The decided figure shape is displayed on a display unit 21.

Figure 9:
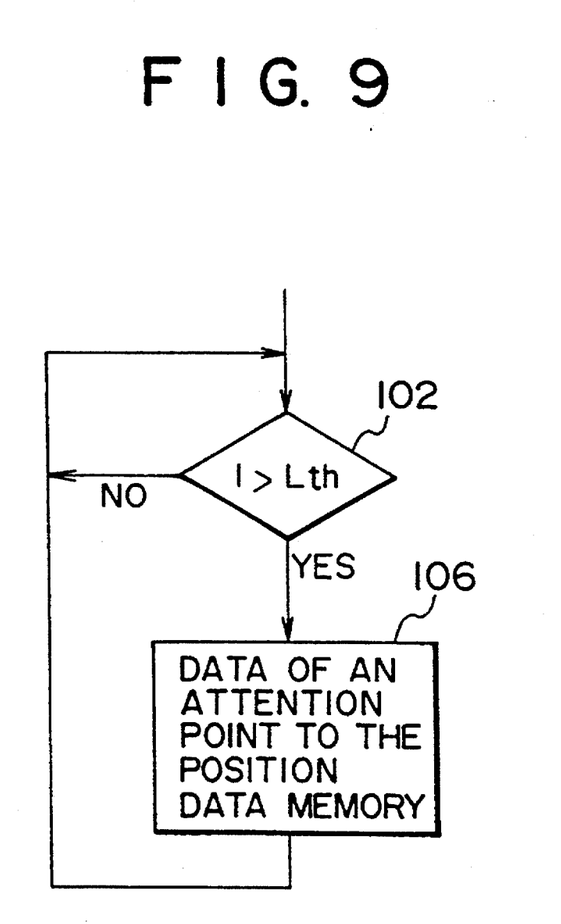
FIG. 9 shows a flow chart illustrating the performance of the discard decision unit of FIG. 8.

FIG. 9 shows a flow chart illustrating the performance of the discard decision unit 31 where 102 and 106 are program steps executed in the discard decision unit 31.

When the picture input unit 11 is a TV camera or a CCD sensor for converting a picture of a figure drawn on a sheet to an image of the figure, a line of the figure has a wide breadth in the image. The output unit of a train of points 12 reduces the breadth of a line to a point by a conventional line thinning process, and converts the image of the figure to a train of points representing the figure. This train of points are stored in the image memory.

When the picture input unit 11 is an interactive input unit using a digitizer or a tablet, position coordinates data of points in a figure are determined by the picture input unit 11. The output unit of a train for points 12 supplies position coordinates of an attention point to the distance calculation unit 16 and the discard decision unit 31. The distance calculation unit 16 calculates a distance 1 from a sample point lastly stored in the position data memory 13 to the attention point. To a predetermined threshold Lth, the distance 1 is compared in the discard decision unit 31, and when l>Lth(step 102 in FIG. 9), the attention point is recognized as a sample point and is stored in the position data memory 13(step 106 of FIG. 9). Otherwise, the attention point is discarded and a next attention point is read out from the output unit of a train of points 12.

The position data memory 13 is composed, for example, of a FIFO(first-in-first-out) memory having addresses 1–N. A newly stored data is written at an address 1, transferring data which has been stored at an address K ($1 \leq K < N$) to an address K+1 and extinguishing data which has been stored at an address N. Thus, N newest data are stored in the position data memory 13.

In this specification, a sample point vector is defined as a vector from the sample point to the next sample point. A calculation unit of a feature point probability 32 calculates the feature point probability of a sample point by direction difference between the sample point vector of the sample point and that of the preceding sample point. A sample point is recognized as a feature point in accordance with the feature point probability. For example, a sample point which has a feature point probability larger than a predetermined threshold is recognized as a feature point. A line type decision unit 19 decides the kind of line segments between adjacent feature points. When the directions of the sample point vectors between the feature points are in a same range, the line segments are recognized as a linear line segment, and when the directions of the sample point vectors between the feature points change nearly uniformly, the line segments are recognized as an arc of a circle.

A figure shape decision unit 20 refers to a recognition dictionary(not shown in the drawing) for the feature point probability decided by the calculation unit of a feature point probability 32 and for the line type decided by the line type decision unit 19, and determines a figure shape in accordance with the matching to the dictionary data. The result of recognition at the figure shape decision unit 20 is displayed by the display unit 21.

In the heretofore known apparatus described in connection with FIG. 8, the calculation unit of a feature point probability 32 is liable to give a mistaken output, resulting in a mistaken decision in the figure shape decision unit 20 when the image of the figure has noise interferences.

When the picture input unit 11 is a TV camera or a CCD sensor for generating analog voltage signals, the analog signals must first be converted to binary signals, and at the conversion, a random noise called an edge noise is generated. For a handwritten figure, trembling of a hand produces a random noise. In an interactive input unit where an LCD is combined with a tablet, a burst noise may be generated by electro-magnetic waves radiated from the LCD.

Figure 10A:
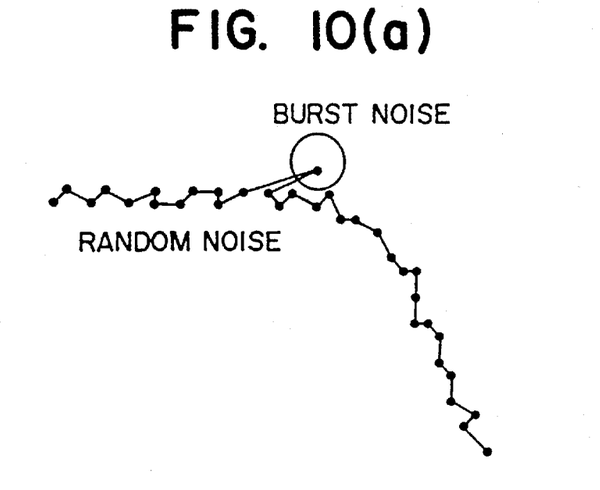
FIG. 10(a) shows an example of noise influence on a train of points.
Figure 10B:
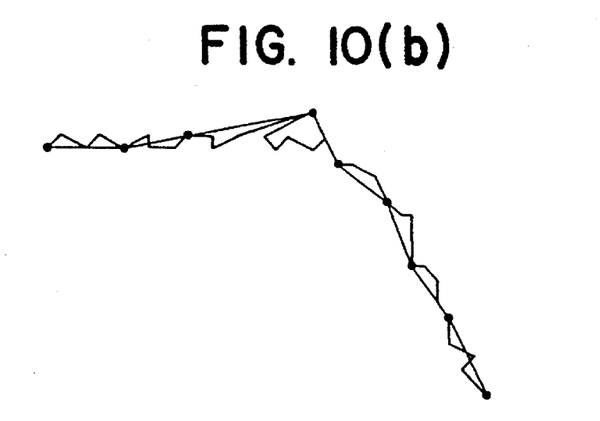
FIG. 10(b) shows an example of a mistaken decision of sample points.
Figure 10C:
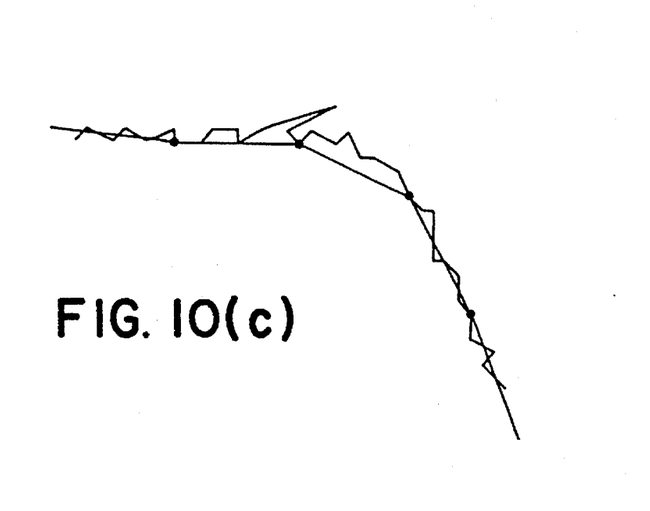
FIG. 10(c) shows another example of a mistaken decision of sample points.

FIGS. 10 show effect of a random and a burst noise on the apparatus of FIG. 8. FIG. 10(a) shows a train of points in the image memory of the output unit of a train of points 12, under an influence of a random noise and a burst noise. A black point surrounded by a circle shows the influence of a burst noise, and all the other black points show the influence of a random noise. The threshold value Lth in FIG. 9 is to be determined to eliminate the influence of the random noise. When Lth is determined as shown in FIG. 10(b), the point under the influence of the burst noise may be selected as a sample point and recognized as a feature point. When Lth is determined as shown in FIG. 10(c), the point under the influence of the burst noise is eliminated, but the shape of the figure can not be faithfully reproduced by sample points and a feature point may be overlooked.

SUMMARY OF THE INVENTION

Therefore, an object of the present invention is to provide a figure recognition apparatus wherein noise interference to a train of points can be effectively eliminated.

In the present invention, an attention point vector is defined as a vector starting from a sample point which is lastly stored in the position data memory and terminating at an attention point newly read out from the output unit of a train of points. Difference of angle "d" between the direction of the attention point vector and an average value of the direction of the sample point vectors of sample points which are in a neighborhood of the attention point, is used as a criterion for discard decision of the attention point. When "d" is larger than a predetermined second threshold Dth2, the attention point is considered as being influenced by a noise, and the attention point is discarded. When "d" is smaller than a predetermined first threshold Dth1, the attention point is considered to be on a line connecting neighboring attention points and is not necessary to be registered as a sample point.

However, when tile magnitude of the attention point vector is larger than a predetermined threshold, the attention point is registered as a sample point in order to limit the magnitude of a sample point vector in a part of a figure composed of a long straight line.

Further, in order to eliminate a burst noise interference, several points which follow the attention point are read out in advance, and the distances from the sample point lastly stored in the position data memory to these points read out in advance are referred for discard decision.

BRIEF DESCRIPTION OF THE DRAWINGS

Further objects, features, and advantages of this invention will become apparent from a consideration of the following description, the appended claims, and the accompanying drawings in which the same numerals indicate the same or the corresponding parts.

DETAILED DESCRIPTION OF THE PREFERRED EMBODIMENTS

Figure 4:
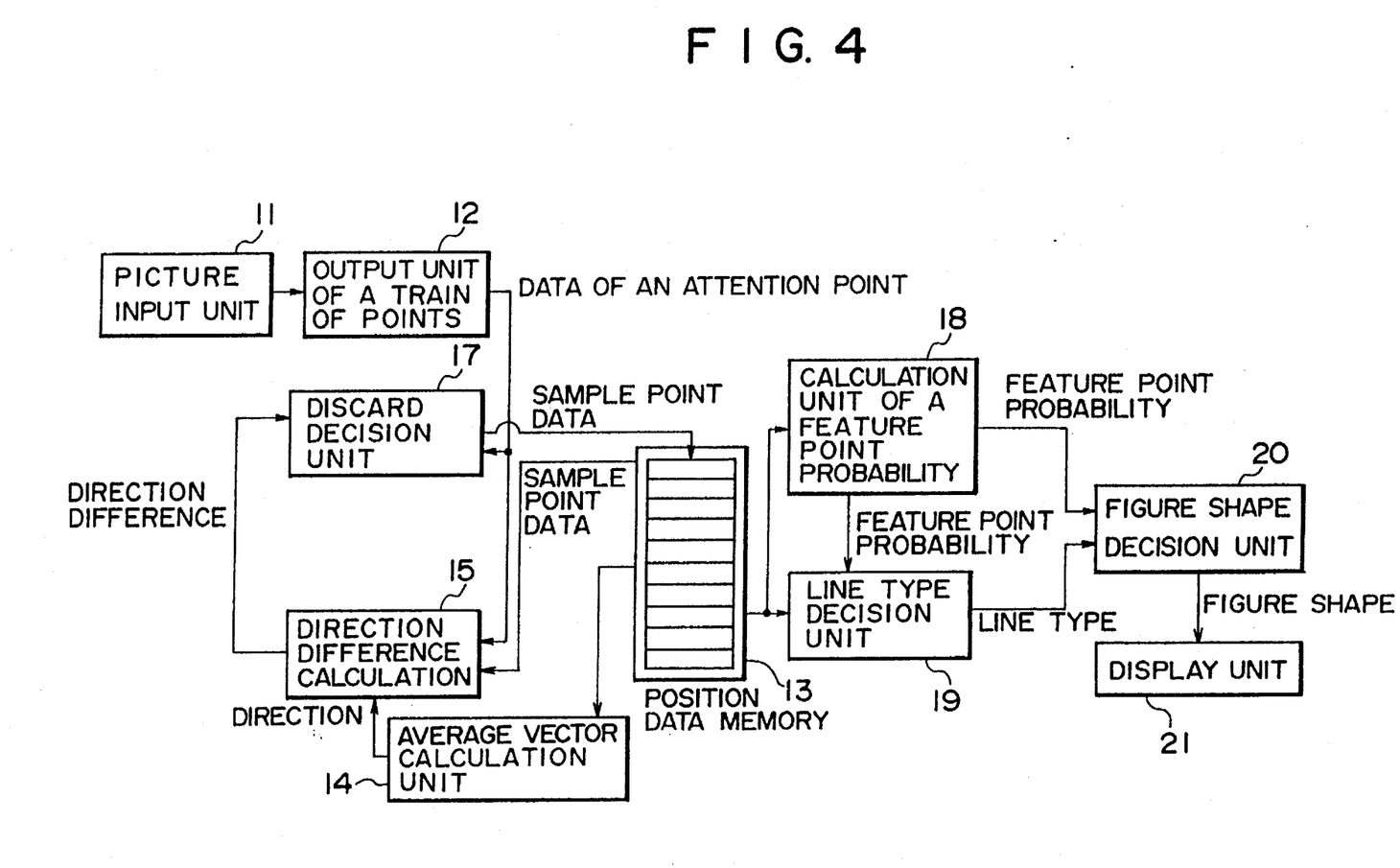
FIG. 4 shows a block diagram of a first embodiment of this invention.

Referring first to FIG. 4, a first embodiment of this invention is explained. The picture input unit 11, the output unit of a train of points 12, the position data memory 13, the line type decision unit 19, the figure shape decision unit 20, and the display unit 21 are the same with the corresponding parts in FIG. 8.

An average vector calculation unit 14 calculates an average vector direction for a predetermined number of sample points lately stored in the position data memory 13. The average vector direction may be defined in different ways. For example, the average vector direction may be the direction of a sample point vector lastly stored in the position data memory, or an average value of directions of sample point vectors for a predetermined number of sample points lately stored in the position data memory 13, or a direction of a vector terminating at the lastly stored sample point and starting from a nearest sample point which has a distance from the lastly stored sample point larger than a predetermined distance Lb.

The average vector direction may have different values in accordance with the difference of the definition. But, the difference of the value will not substantially influence the result of discard decision in a discard decision unit 17.

A direction difference calculation unit 15 calculates a direction difference between the attention point vector starting from the sample point lastly stored in the position data memory 13 and terminating at the attention point and the average vector direction which is calculated by the average direction calculation unit 14. The direction difference is expressed by its absolute value "d".

Figure 5:
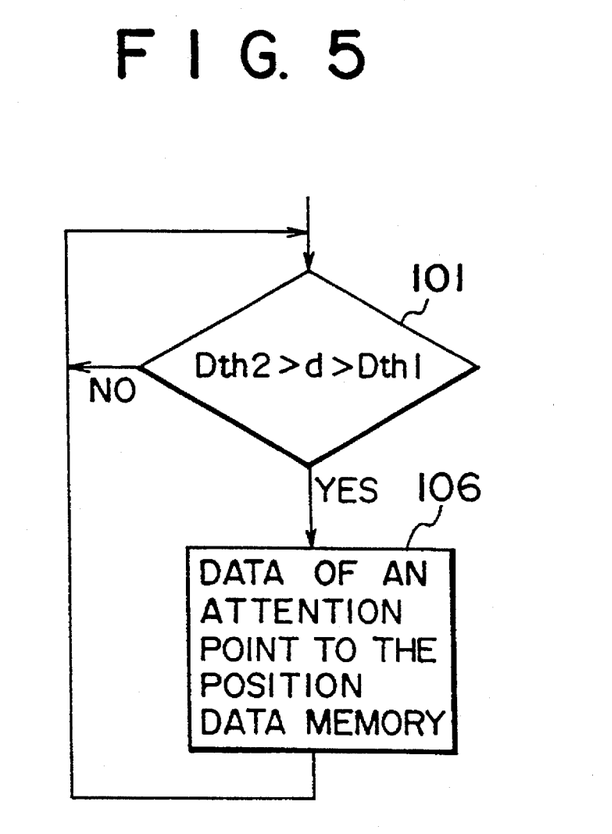
FIG. 5 shows a flow chart illustrating the performance of the discard decision unit of FIG. 4.

In the flow chart of FIG. 5 illustrating the performance of the discard decision unit 17 of FIG. 4, d≦Dth1(Dth1 being a first threshold direction difference) means that the attention point is on a line of the average vector direction and need not be registered as a sample point, and d≧Dth2(Dth2 being a second threshold direction difference) means that the attention point is influenced by noise and should not be registered as a sample point. Therefore, when the answer of the step 101 in FIG. 5 is NO, the attention point is discarded and the next attention point is read out. When the answer is YES, the step goes to a step 106, where the data of the attention point is stored as a sample point in the position data memory 13.

Figure 7:
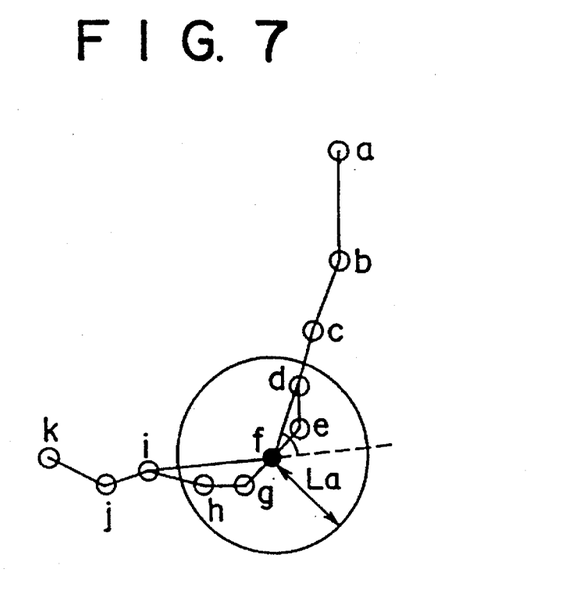
FIG. 7 shows a train of sample points illustrating the performance of the calculation unit of a feature point probability in this invention.

The performance of a calculation unit of a feature point probability 18 is described in connection with FIG. 7. In FIG. 7, points, a, b . . . j,k are sample points, "a" being an oldest sample point and "k" being a newest sample point. Assume that the feature point probability of a sample point "f" is to be calculated. Let La be a distance threshold, search sample points which are nearest to "f" and have a distance larger than La from "f". Thus, a sample point "c" is found in a group of sample points older than "f" and a sample point "i" is found in a group of sample points newer than "f". An angle between a straight line cf and a straight line fi is defined to represent the feature point probability of the sample point "f".

In the calculation unit of a feature point probability 32 of the prior art of FIG. 8, the feature point probability of the sample point "f" is calculated as an angle between a straight line ef and a straight line fg, and the calculated probability is influenced by random noise. The calculation unit of a feature point probability 18 of this invention can eliminate the influence of the random noise.

Figure 1:
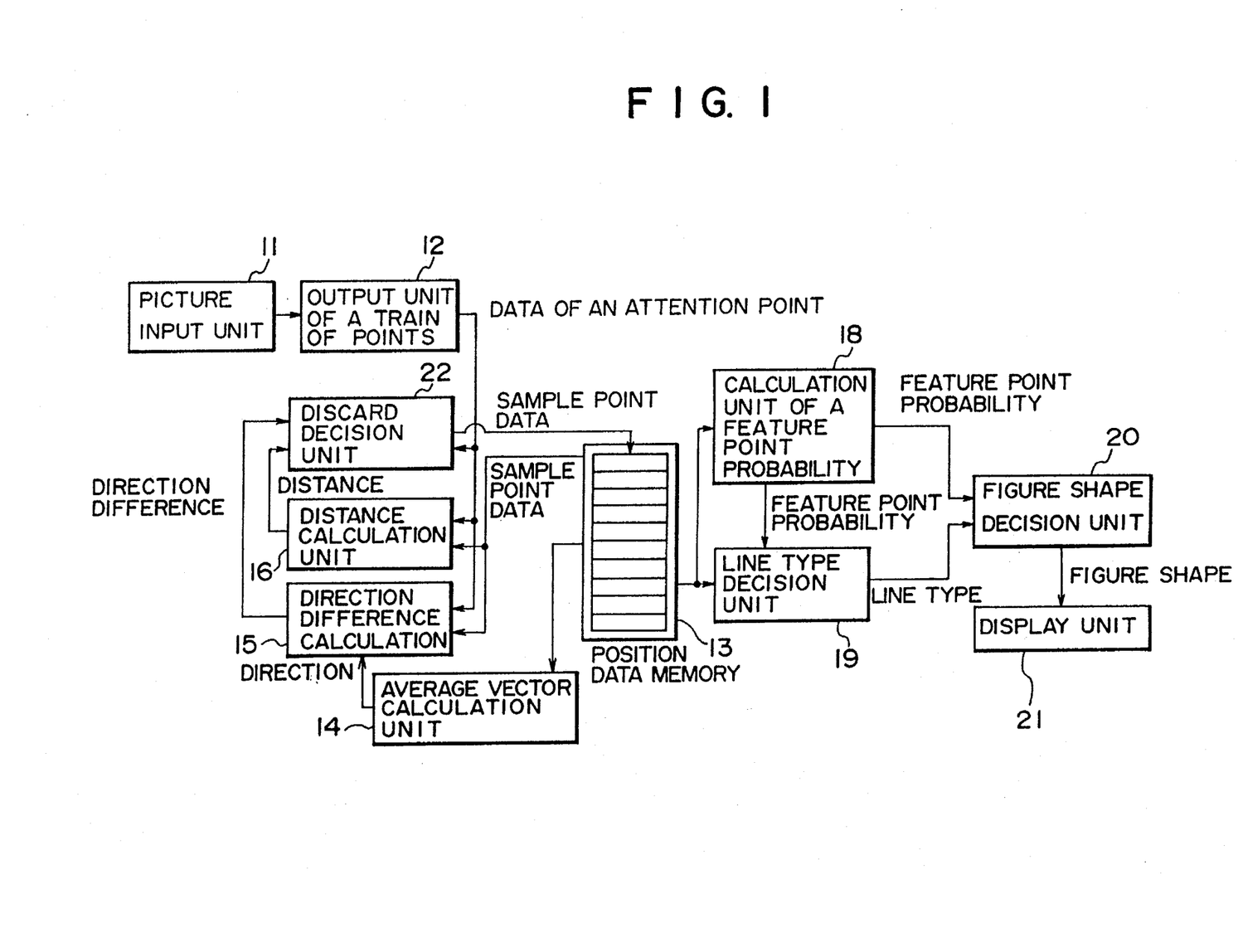
FIG. 1 shows a block diagram of a second embodiment of this invention.
Figure 2:
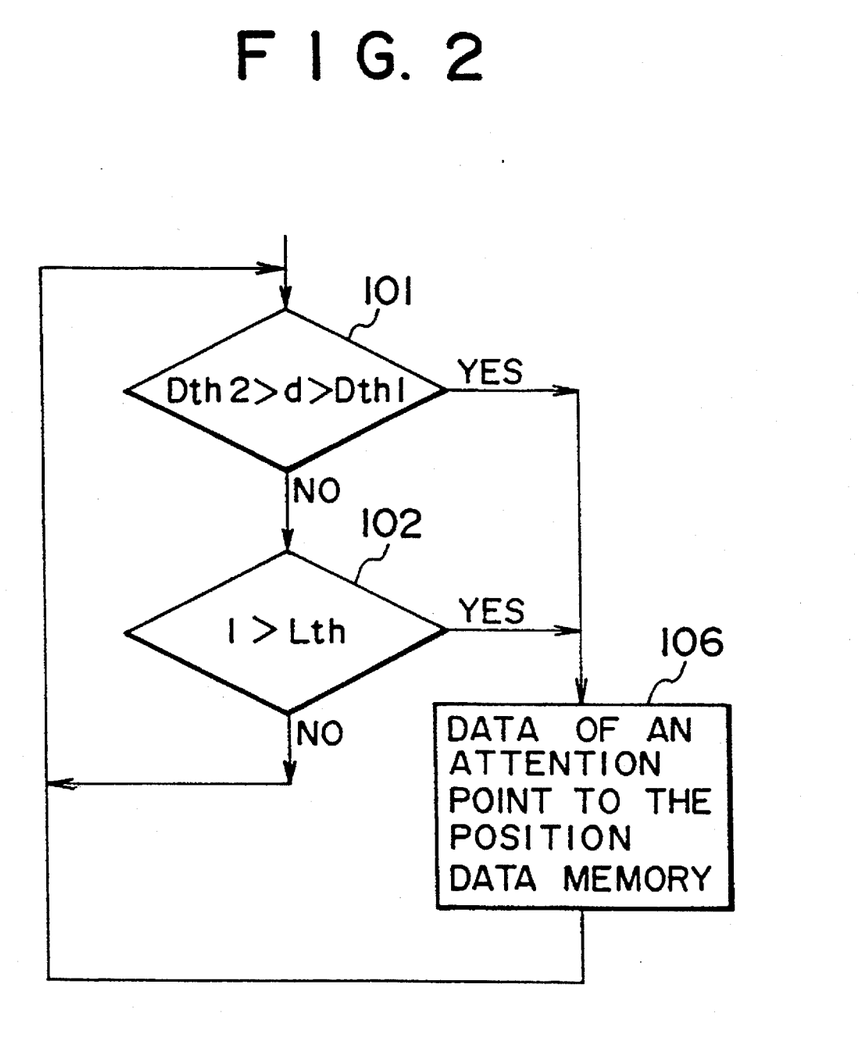
FIG. 2 shows a flow chart illustrating the performance of the discard decision unit of FIG. 1.

Now referring to FIG. 1, a second embodiment of this invention is explained. A distance calculation unit 16 is further provided besides the parts shown in FIG. 4. A discard decision unit 22 refers to the distance calculated by the distance calculation unit 16 and the direction difference "d" calculated by the direction difference calculation unit 15. FIG. 2 shows the performance of the discard decision unit 22. A step 102 is inserted after the step 101 of FIG. 5. The step 102 is introduced to limit a maximum magnitude of a sample point vector. The output 1 of the distance calculation unit 16 is compared to a threshold distance Lth in the step 102, and when l>Lth, the attention point is registered as a sample point through the step 106.

In a third embodiment of this invention, several points succeeding an attention point are read out in advance by the output unit of a train of points 12 together with the attention point. The distance calculation unit 16 calculates the distances of these points from the lastly stored sample point, and when all the calculated distances are larger than the threshold distance Lth, the attention point is stored as a sample point in the position data memory 13.

Figure 3:
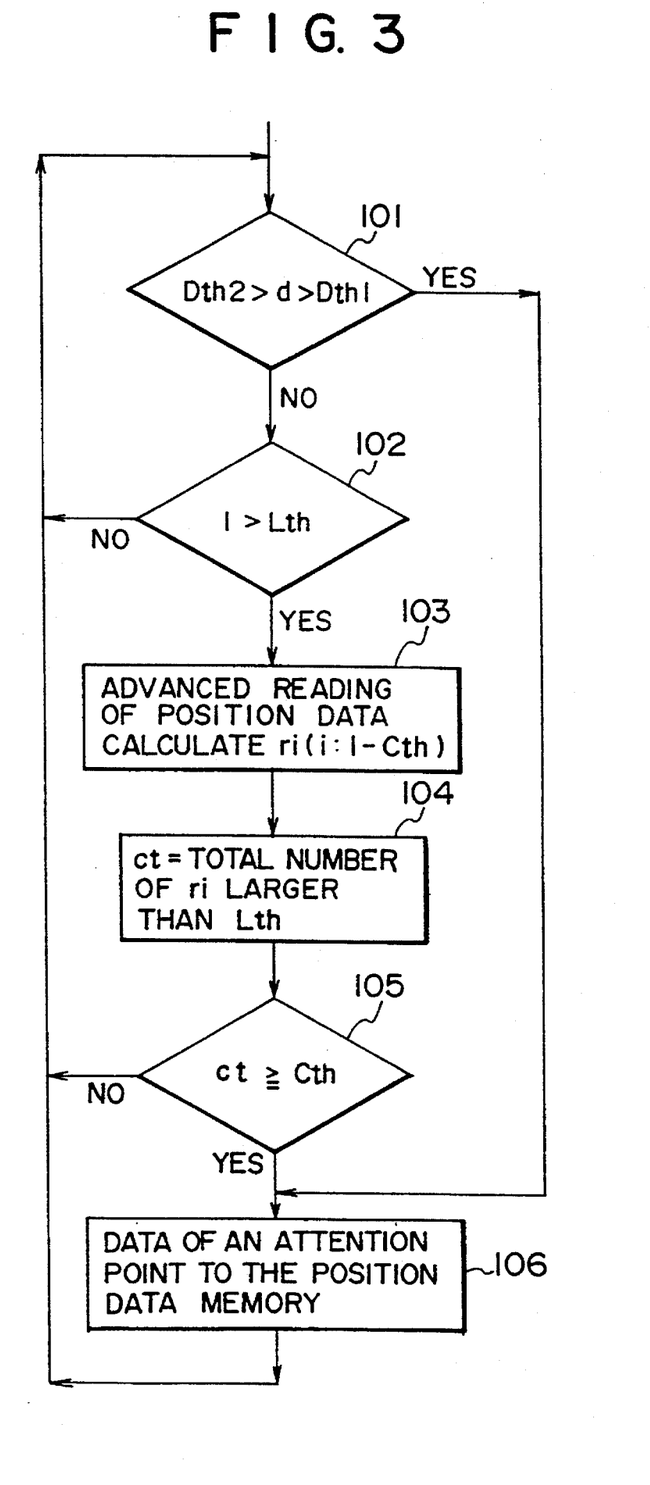
FIG. 3 shows a flow chart illustrating the performance of a discard decision unit of a third embodiment of this invention.
Figure 6A:
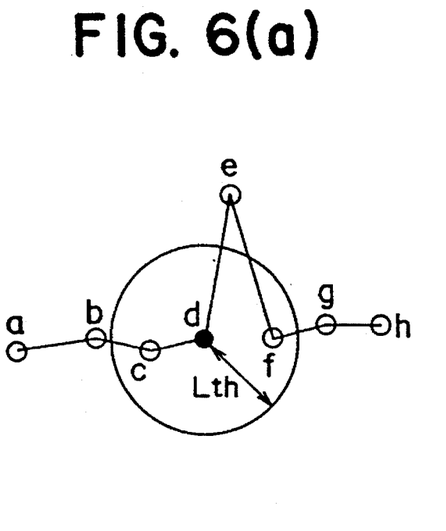
FIG. 6(a) shows a train of points illustrating the performance of a discard decision unit of this invention.

The effect of these points read out in advance is described in connection with FIGS. 6. FIG. 6(a) illustrates a train of points read out from the output unit of a train of points 12, read out in an order from "a" to "h". Point "e" is influenced by a burst noise. When point "e" is the lastly stored sample point, the distance "d–e" is larger than Lth, and in a flow chart shown in FIG. 2, the point "e" is mistakenly registered as a sample point. In order to avoid this mistake, program steps 103, 104, and 105 are supplemented as shown in FIG. 3.

In step 103, distances ri from the lastly stored sample point(point "d" in FIG. 6(a)) are calculated for Cth points read out in advance. In step 104, distances ri are compared to Lth, and the total number of ri larger than Lth is denoted by ct. Step 105 means that the answer YES is obtained only when all the distances ri of Cth points are larger than Lth. Returning to FIG. 6(a), assume Cth=2, the distance "d–e" (r1 in the step 103) is smaller than Lth, and the point "e" is discarded by step 105.

Figure 6B:
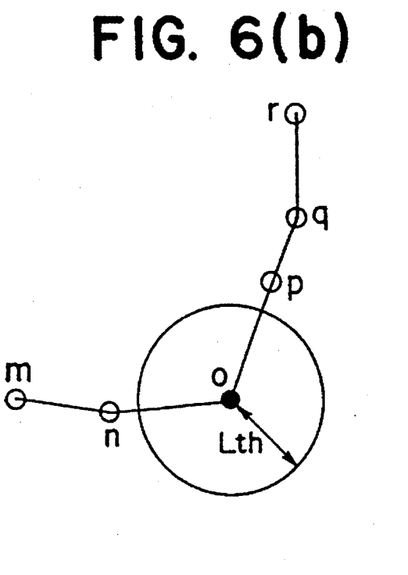
FIG. 6(b) shows another train of points illustrating the performance of a discard decision unit of this invention.

For a train of points as shown in FIG. 6(b), when point "o" is the lastly stored sample point, and point "p" is an attention point, the answer of the step 102 is YES, and the program goes to the step 103. Here r1 is the distance "o–q" and r2 is the distance "o–r". Since r1>Lth and r2>Lth, ct=2. In the step 105, ct=Cth, and the attention point is registered as a sample point through the step 106.

What is claimed is:

1. A figure recognition apparatus comprising:

a picture input unit for converting a figure of lines into electrical signals;

an output unit for a train of points for storing data for a plurality of points, said data at least including position coordinate data for a plurality of points representing said figure of lines in a memory, and for reading out the data for the plurality of points sequentially from said memory;

a position data memory for storing at least a predetermined number of sample points;

an average vector calculation unit for calculating an average value of directions for a predetermined number of sample point vectors stored in said position data memory, wherein a sample point vector is a vector starting from a sample point of attention and terminating at a sample point immediately following said sample point;

a direction difference calculation unit for calculating an absolute value of a direction difference between said average value of directions and a vector starting from a sample point most recently stored in said position data memory and terminating at an attention point, said attention point being defined as a point currently read out from said output unit of a train of points;

a discard decision unit for registering an attention point as a sample point in said position data memory when said direction difference of an attention point calculated by said direction difference calculation unit is larger than a predetermined first threshold value Dth1 and smaller than a predetermined second threshold value Dth2;

a calculation unit for calculating a feature point probability of each sample point stored in said position data memory, and for selecting feature points from sample points in accordance with said feature point probability;

a line type decision unit for deciding, for each feature point, whether a line segment between said feature point and a next feature point is a straight line segment or an arc of a circle; and a figure shape decision unit for deciding a figure shape of said figure of line input from said picture input unit, in accordance with the output of said calculation unit of a feature point probability and said line type decision unit;

wherein said calculation unit determines feature point probability of a sample point of attention as an angle between two vectors, one vector of said two vectors starting from a newest sample point of sample points which are older than a sample point of attention having a distance larger than a predetermined value La, and terminating at said sample point of attention, the other vector of said two vectors starting from said sample point of attention and terminating at an oldest sample point of sample points which are newer than said point of attention having a distance larger than La.

2. A figure recognition apparatus of claim 1, wherein said average vector calculation unit determines said average value of directions as the direction of a sample point vector terminating at a sample point most recently stored in said position data memory.

3. A figure recognition apparatus of claim 1, wherein said average vector calculation unit determines said average value of directions as an average value of directions of sample point vectors for a predetermined number of sample points most recently stored in said position data memory.

4. A figure recognition apparatus of claim 1, wherein said average vector calculation unit determines said average value of directions as a direction of a vector starting from a sample point which is a newest sample point having a distance larger than a predetermined threshold Lb from a sample point most recently stored in said position data memory, and terminating at said sample point most recently stored in said position data memory.

5. A figure recognition apparatus of claim 1, wherein said calculation unit of a feature point probability selects sample points having a feature point probability larger than a predetermined threshold as feature points.

6. A figure recognition apparatus of claim 5, wherein said average vector calculation unit determines said average value of directions as the direction of a sample point vector terminating at a sample point most recently stored in said position data memory.

7. A figure recognition apparatus of claim 5, wherein said average vector calculation unit determines said average value of directions as an average value of directions of sample point vectors for a predetermined number of sample points stored in said position data memory.

8. A figure recognition apparatus of claim 5, wherein said average vector calculation unit determines said average value of directions as a direction of a vector starting from a sample point which is a newest sample point having a distance larger than a predetermined threshold Lb from a sample point most recently stored in said position data memory, and terminating at said sample point most recently stored in said position data memory.

9. A figure recognition apparatus of claim 5, wherein said calculation unit of a feature point probability determines feature point probability of a sample point of attention as an angle between two vectors, the one vector of said two vectors starting from a newest sample point of sample points which are older than said sample point of attention and have a distance larger than a predetermined value La, and terminating at said sample point of attention, the other vector of said two vectors starting from said sample point of attention and terminating at an oldest sample point of sample points which are newer than said sample point of attention having distance larger than La.

10. A figure recognition apparatus of claim 9, wherein said calculation unit of a feature point probability selects sample points having a feature point probability larger than a predetermined threshold as feature points.

* * * * *